United States Patent Office 3,177,216
Patented Apr. 6, 1965

3,177,216
4-TRIFLUOROMETHYL-2-THIO-5H-ALKA[d]-
PYRIMIDINES AND CONGENERS
Hans A. Wagner, Chicago, Ill., assignor to G. D. Searle
& Co., Chicago, Ill., a corporation of Delaware
No Drawing. Filed Dec. 28, 1961, Ser. No. 162,961
5 Claims. (Cl. 260—251)

This invention relates to 4-trifluoromethyl-2-thio-5H-alka[d]pyrimidines and congeners, and also processes for the preparation thereof. More particularly, this invention relates to new and useful chemical compounds having any one of the formulas.

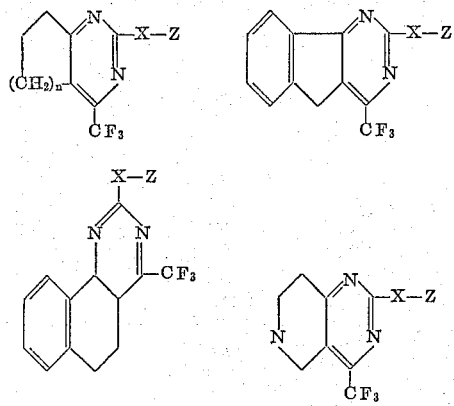

wherein X represents either sulfur or the sulfonyl radical(—SO$_2$—), Z represents an alkyl radical optionally substituted by a phenyl radical, and $n$ represents a positive integer less than 5.

Among the alkyl radicals represented by Z, especially lower alkyl radicals are preferred, which is to say methyl, ethyl, propyl, isopropyl, butyl, isobutyl, sec-butyl, tert-butyl, pentyl, neopentyl, hexyl, isohexyl, heptyl, and like —C$_m$H$_{2m+1}$ groupings wherein $m$ represents a positive integer less than 8. Substitution of these alkyl radicals by phenyl radicals gives rise to such groupings as benzyl, phenylethyl, etc. likewise within the ambit of Z as hereinbefore set forth.

The compounds to which this invention relates are useful because of their valuable pharmacological properties. Thus, for example, they are anti-biotics effective against bacteria such as *B. subtilis and E. coli*, fungi such as *Trichophyton mentagrophytes*, algae such as *Chlorella vulgaris*, and cotyledenous seed germination. Further, they are anti-chloesterologenic agents adapted to inhibit exogenous hyperchloesterolemia; and, finally, they counteract the heat, swelling, and rubor characteristic of the inflammatory response to tissue insult.

Preparation of the subject compounds proceeds by heating a cyclic ketone of the formula

with ethyl trifluoroacetate catalyzed by sodium methoxide in an inert liquid medium, and condensing the 2-trifluoroacetyl derivative which results with an appropriate 2-thio-pseudouronium mineral acid salt of cationic composition

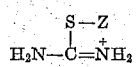

by heating in an inert liquid medium catalyzed ad libitum by a strong acid such as p-toluenesulfonic acid. The 2-thio compounds thus obtained

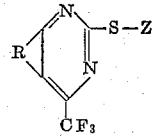

in turn are converted to corresponding 2-sulfonyl compounds by oxidation with peracetic acid in acetic acid solution. In the foregoing schematic representation of processes for preparing the instant compounds, Z retains the means previously assigned and R represents a radical having one of the formulas

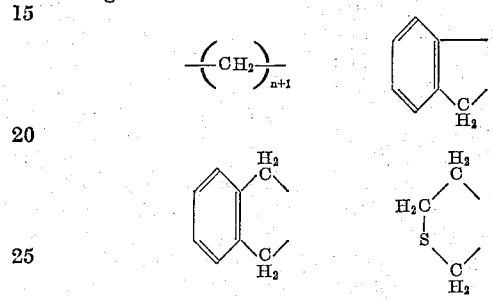

$n$, like Z, being defined as before.

The following examples describe in detail compounds illustrative of the present invention and methods which have been devised for their manufacture. However, the invention is not to be construed as limited thereby, either in spirit or in scope, since it will be apparent to those skilled in the art of organic synthesis that many modifications, both of materials and of methods, may be practiced without departing from the purpose and intent of this disclosure. Throughout the examples hereinafter set forth, temperatures are given in degrees centigrade, pressures in millimeters of mercury, and relative amounts of materials in parts by weight, except as otherwise noted.

EXAMPLE 1

A. *2-trifluoroacetylcyclopentanone.* — To a suspension of 18 parts of sodium methoxide in 350 parts of anhydrous ether is added, with vigorous agitation during 20 mintues, approximately 36 parts of ethyl trifluoroacetate. A solution of approximately 25 parts of cyclopentanone in 150 parts of anhydrous ether is thereupon introduced; and the resultant mixture is heated at the boiling point under reflux for 2 hours and then maintained at room temperatures overnight, agitation being continued the while. A solution of approximately 21 parts of glacial acetic acid in 100 parts of water is next added, followed by a solution of approximately 37 parts of magnesium acetate tetrahydrate in 25 parts of water. Ether is thereupon removed by distillation; and the precipitate which forms is collected on a filter, washed thereon with water, and steam-distilled until a test portion of the distillate remains clear on standing at room temperatures. At this point, a solution of approximately 17 parts of concentrated sulfuric acid in 100 parts of water is added to the distilland, whereupon steam distillation is resumed until a test portion of the distillate gives a negative ferric chloride test. The distilland is then cooled and extracted with dichloromethane. The dichloromethane extract is dried over anhydrous calcium sulfate and freed of solvent by distillation. The residue is 2-trifluoroacetylcyclopentanone boiling at 27°/2 mm.

B. *4 - trifluoromethyl - 6,7 - dihydro - 2 - methylthio-5H-cyclopenta[d]pyrimidine.*—A mixture of 3 parts of 2-trifluoroacetylcyclopentanone and 3 parts of 2-methyl-2-thiopseudouronium sulfate in 80 parts of ethanol is heated at the boiling point under reflux for 18 hours. Ethanol is then removed by vacuum distillation, and the residue is poured into 200 parts of water. The resultant mixture is extracted with pentane. From the pentane extract, on cooling at dry-ice temperatures, the desired 4-trifluoromethyl - 6,7 - dihydro - 2 methylthio - 5H - cyclopenta[d]pyrimidine crystallizes. Filtered out and dried in air, the product melts at 61–63°. It has the formula

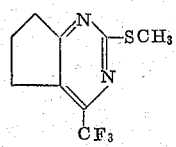

EXAMPLE 2

4 - trifluoromethyl - 6,7 - dihydro - 2 - methylsulfonyl-5H-cyclopenta[d]pyrimidine. To a solution of 1 part of 4 - trifluoromethyl - 6,7 - dihydro - 2 - methylthio - 5H-cyclopenta[d]pyrimidine in 10 parts of glacial acetic acid is slowly added 2 parts of a 40% solution of peracetic acid in acetic acid, temperature being maintained in the neighborhood of 60° throughout. The resultant mixture is poured into 200 parts of cold water; and the precipitate which forms is filtered off and successively washed with water, aqueous sodium bicarbonate, and water. Thereupon dried in air and recrystallized from a mixture of ethanol and ethyl acetate, it affords 4-trifluoromethyl-6,7-dihydro - 2 - methylsulfonyl - 5H - cyclopenta[d]pyrimidine melting at approximately 118–119°. The product has the formula

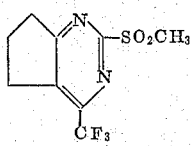

EXAMPLE 3

A. *2-trifluoroacetylcyclohexanone.*—Substitution of 25 parts of cyclohexanone for the cyclopentanone called for in Example 1A affords, by the procedure there detailed, 2-trifluoroacetylcyclohexanone.

B. *4 - trifluoromethyl - 5,6,7,8 - tetrahydro - 2 - methylthioquinazoline.*—A mixture of 3 parts of 2-trifluoroacetylcyclohexanone and 3 parts of 2-methyl-2-thiopseudouronium sulfate in 80 parts of ethanol is heated at the boiling point under reflux for 18 hours. The ethanol is thereupon removed by vacuum distillation, and the residue is poured into 200 parts of water. The resultant mixture is extracted with dichloromethane. The dichloromethane extract is dried over anhydrous calcium sulfate and stripped of solvent by vacuum distillation. The residue is 4-trifluoromethyl-5,6,7,8-tetrahydro-2-methylthioquinazoline, having the formula

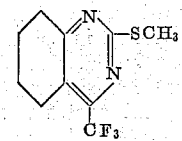

EXAMPLE 4

A. *2-trifluoroacetylcycloheptanone.*—Substitution of 33 parts of cycloheptanone for the cyclopentanone called for in Example 1A affords by the procedure there detailed, 2-trifluoroacetylcycloheptanone.

B. *4 - trifluoromethyl - 6,7,8,9 - tetrahydro - 2 - methylthio-5H-cyclohepta[d]pyrimidine.*—Substitution of 3 parts of 2-trifluoroacetylcycloheptanone for the 2-trifluoroacetylcyclohexanone called for in Example 3B affords, by the procedure there detailed, 4 - trifluoromethyl - 6,7,8,9-tetrahydro-2-methylthio-5H-cyclohepta[d]pyrimidine as a viscous oil. The product has the formula

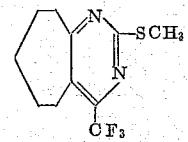

EXAMPLE 5

*4 - trifluoromethyl - 6,7,8,9 - tetrahydro - 2 - methylthio-5H-cyclohepta[d]pyrimidine.*—Substitution of 1 part of 4 - trifluoromethyl - 6,7,8,9 - tetrahydro - 2 - methylthio-5H-cyclohepta[d]pyrimidine for the 4-trifluoromethyl-6,7 - dihydro - 2 - methylthio - 5H - cyclopenta[d]pyrimidine called for in Example 2 affords, by the procedure there detailed, 4-trifluoromethyl-6,7,8,9-tetrahydro-2-methylthio-5H-cyclohepta[d]pyrimidine as a colorless solid melting at approximately 86°. The product has the formula

EXAMPLE 6

A. *2-trifluoroacetylcyclooctanone.*—Substitution of 38 parts of cyclooctanone for the cyclopentanone called for in Example 1A affords, by the procedure there detailed, 2-trifluoroacetylcyclooctanone.

B. *4 - trifluoromethyl-5,6,7,8,9,10 - hexahydro - 2-methylthiocycloocta[d]pyrimidine.*—Substitution of 3 parts of 2-trifluoroacetylcyclooctanone for the 2-trifluoroacetylcyclohexanone called for in Example 3B affords, by the procedure there detailed, 4-trifluoromethyl-5,6,7,8,9,10 - hexahydro - 2 - methylthiocycloocta[d]pyrimidine, having the formula

EXAMPLE 7

*4 - trifluoromethyl-5,6,7,8,9,10 - hexahydro - 2 - methylsulfonylcycloocta[d]pyrimidine.*—Substitution of 1 part of 4 - trifluoromethyl - 5,6,7,8,9,10 - hexahydro - 2-methylthiocycloocta[d]pyrimidine for the 4-trifluoromethyl-6,7-dihydro - 2 - methylthio - 5H - cyclopenta[d]pyrimidine called for in Example 2 affords, by the procedure there detailed, 4 - trifluoromethyl - 5,6,7,8,9,10 - hexahydro - 2-methylsulfonylcycloocta[d]pyrimidine melting at approximately 68°. The product has the formula

EXAMPLE 8

A. *2-trifluoroacetyl-1-indanone.*—A mixture of 39 parts of 1-indanone, 42 parts of ethyl trifluoroacetate, and 18 parts of sodium methoxide in 400 parts of benzene is heated at the boiling point under reflux for 2 hours and then maintained at room temperatures overnight, with vigorous agitation throughout. Approximately 21 parts of acetic acid in 100 parts of water is thereupon introduced, followed by a solution of 40 parts of cupric acetate in 250 parts of water. Benzene is removed by distillation, and the solid precipitate which forms is isolated by filtration and then steam-distilled until a test portion of the distillate remains clear on standing at room temperatures. Distillation is thereupon interrupted while a solution of approximately 17 parts of concentrated sulfuric acid in 100 parts of water is added to the distilland. Steam distillation is then resumed until a test portion of the distillate affords a negative ferric chloride test, at which point the distilland is cooled and extracted with dichloromethane. The dichloromethane extract is dried over anhydrous sodium sulfate and stripped of solvent by vacuum distillation. Recrystallization of the residue from pentane at Dry-Ice temperature affords 2-trifluoroacetyl-1-indanone melting at approximately 67°.

B. *4 - trifluoromethyl - 6,7,8,9 - tetrahydro - 2 - methylthio-5H-indeno[1,2-d]pyrimidine.*—A mixture of 23 parts of 2-trifluoroacetyl-1-indanone, 23 parts of 2-methyl-2-thiopseudouronium sulfate, and 1 part of p-toluenesulfonic acid in 300 parts of ethanol is heated at the boiling point under reflux for 17 hours. The ethanol is then removed by vacuum distillation, and the gummy residue is taken up in benzene. The benzene solution is filtered, dried over anhydrous sodium sulfate, and chromatographed on silica gel, using benzene and ethyl acetate in increasing proportions of the latter as developing solvent. From an eluate comprising 20% ethyl acetate in benzene, on distillation of solvent and recrystallization of the residue from ethanol, there is obtained 4-trifluoromethyl-6,7,8,9-tetrahydro-2-methylthio-5-H-indeno[1,2-d]pyrimidine melting at approximately 86°. The product has the formula

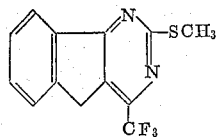

EXAMPLE 9

A. *2 - trifluoroacetyl - 3,4 - dihydro - 1(2H) - naphthalenone.*—Substitution of 44 parts of 1-tetralone for the 1-indanone called for in Example 8A affords, by the procedure there detailed, 2-trifluoroacetyl-3,4-dihydro-1(2H)-naphthalenone melting at approximately 49°.

B. *4 - trifluoromethyl -5,6- dihydro -2- methylthiobenzo-[h]quinazoline.*—A mixture of 20 parts of 2-trifluoroacetyl-3,4-dihydro-1(2H)-naphthalenone, 23 parts of 2-methyl-2-thiopseudouronium sulfate, 1 part of p-toluenesulfonic acid, and 500 parts of methanol is heated at the boiling point under reflux for 56 hours. The solvent is thereupon removed by distillation, and the residue is poured into 2 volumes of water. The solid precipitate thrown down is filtered off, dried in air, and recrystallized from acetone to give 4-trifluoromethyl-5,6-dihydro-2-methylthiobenzo[h]quinazoline melting at approximately 144°. The product has the formula

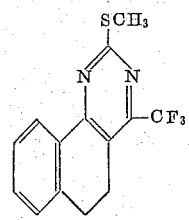

EXAMPLE 10

*4 - trifluoromethyl - 5,6 - dihydro - 2 - methylsulfonylbenzo[h]quinazoline.*—To a solution of 1 part of 4-trifluoromethyl - 5,6 - dihydro - 2 - methylthiobenzo[h]quinazoline in 5 parts of glacial acetic acid at temperatures below 65° is added, with agitation, 2 parts of a 40% solution of peracetic acid in acetic acid. The resultant mixture is allowed to stand at room temperatures for 3 hours, then poured into 300 parts of water. The precipitate thrown down is filtered off and consecutively washed with water, dilute aqueous sodium bicarbonate, and water. Dried in air and recrystallized from a mixture of ethanol and acetone, it affords 4-trifluoromethyl-5,6-dihydro-2-methylsulfonylbenzo[h]quinazoline melting at approximately 223–224°. The product has the formula

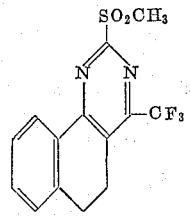

EXAMPLE 11

A. *2-trifluoroacetyltetrahydro-1,4-thiopyrone.*—Substitution of 35 parts of tetrahydro-1,4-thiopyrone for the 1-indanone called for in Example 8A affords, by the procedure there detailed, 2-trifluoroacetyltetrahydro-1,4-thiopyrone, which is an orange-colored oil at room temperatures.

B. *2-benzylthio-4-trifluoromethyl-7,8-dihydro-5H-thiopyrano[4,3-d]pyrimidine.*—A mixture of 12 parts of 2-trifluoroacetyltetrahydro-1,4-thiopyrone, 13 parts of 2-benzyl-2-thiopseudouronium chloride, and 1 part of p-toluenesulfonic acid in 300 parts of ethanol is heated at the boiling point under reflux for 16 hours. Solvent is thereupon removed by distillation, and the residue is taken up in dichloromethane. The dichloromethane extract is filtered, dried over anhydrous sodium sulfate, and freed of solvent by vacuum distillation. The residual viscous oil is 2-benzylthio-4-trifluoromethyl-7,8-dihydro-5H-thiopyrano[4,3-d]pyrimidine, having the formula

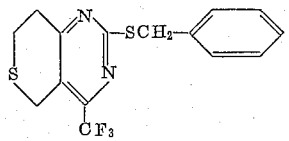

EXAMPLE 12

*2 - benzylsulfonyl - 4 - trifluoromethyl - 7,8 - dihydro-5H-thiopyrano[4,3-d]pyrimidine 6,6-dioxide.*—To a solution of 1 part of 2-benzylthio-4-trifluoromethyl-7,8-dihydro-5H-thiopyrano[4,3-d]pyrimidine in 5 parts of glacial acetic acid at temperatures below 60° is added 4 parts of a 40% solution of peracetic acid in acetic acid. The resultant mixture is allowed to stand at room temperatures for 3 hours and then poured into 300 parts of water. The precipitate which forms is filtered off and consecutively washed with water, dilute aqueous sodium bicarbonate, and water, then dried in air and recrystallized from aqueous ethanol to give 2-benzylsulfonyl-4-trifluoromethyl - 7,8 - dihydro - 5H - thiopyrano[4,3-d]pyrimidine 6,6-dioxide melting at 148–150° (with decomposition). The product has the formula

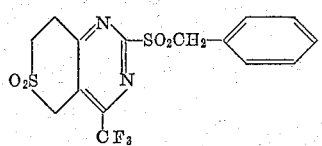

What is claimed is:
1. A compound of the formula

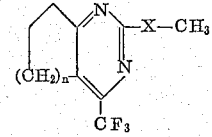

wherein X represents a member of the group consisting of sulfur and the sulfonyl radical and $n$ represents a positive integer less than 5.

2. A compound of the formula
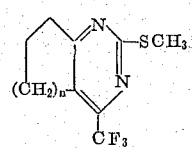
wherein $n$ represents a positive integer less than 5.
3. 4-trifluoromethyl-6,7,8,9-tetrahydro-2-methylthio-5H-cyclohepta[d]pyrimidine.
4. A compound of the formula
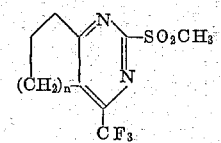
wherein $n$ represents a positive integer less than 5.
5. 4 - trifluoromethyl - 5,6,7,8,9,10 - hexahydro - 2 - methylsulfonylcycloocta[d]pyrimidine.
No references cited.

UNITED STATES PATENT OFFICE
CERTIFICATE OF CORRECTION

Patent No. 3,177,216                                    April 6, 1965

Hans A. Wagner

It is hereby certified that error appears in the above numbered patent requiring correction and that the said Letters Patent should read as corrected below.

Column 1, lines 20 to 29, the left-hand formula should appear as shown below instead of as in the patent:

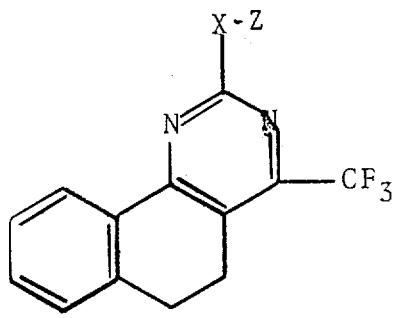

column 2, line 13, for "means" read -- meaning --; column 5, line 27, for "5-H-indeno" read -- 5H-indeno --.

Signed and sealed this 7th day of December 1965.

(SEAL)
Attest:

ERNEST W. SWIDER                            EDWARD J. BRENNER
Attesting Officer                           Commissioner of Patents